W. H. WRIGHT.
Railway-Trucks.
No. 153,918.        Patented Aug. 11, 1874.
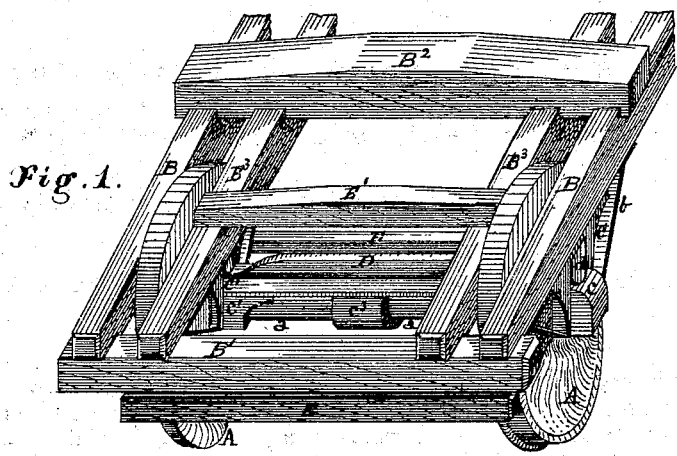
Fig. 1.
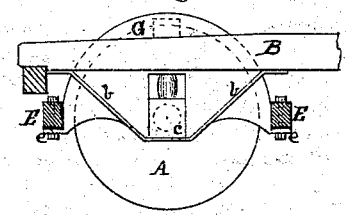
Fig. 2.
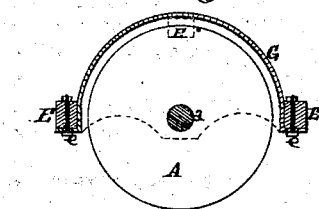
Fig. 3.
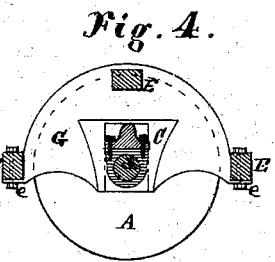
Fig. 4.
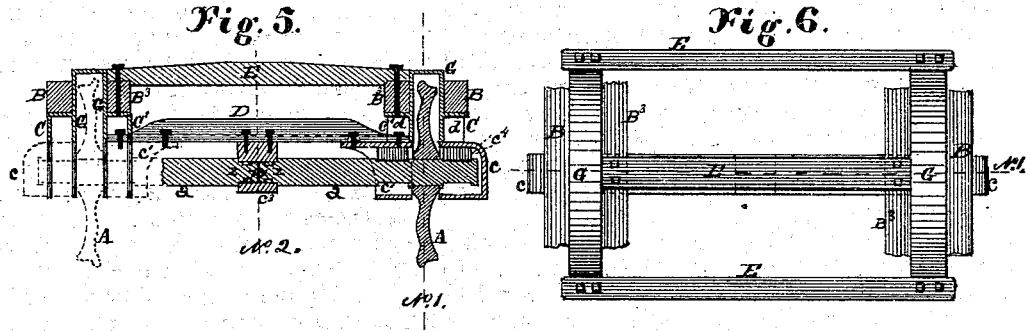
Fig. 5.      Fig. 6.
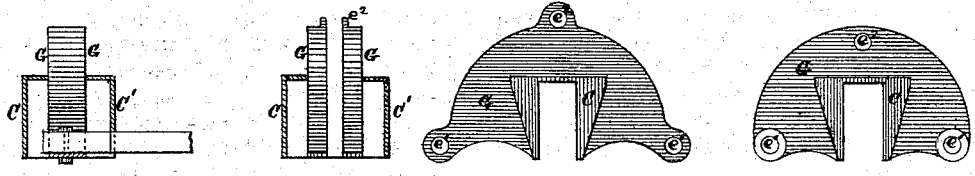
Fig. 7.    Fig. 8.    Fig. 9.    Fig. 10.
Fig. 11.
Witnesses:
Chas. J. Seelenk
Alx. Selkirk
William H. Wright
Inventor.

UNITED STATES PATENT OFFICE.

WILLIAM H. WRIGHT, OF DURHAM, ASSIGNOR OF ONE-HALF HIS RIGHT TO WILLIAM R. TANNER, OF RENSSELAERVILLE, AND ALMERAN J. UTTER AND CYRUS H. NEWMAN, OF DURHAM, NEW YORK.

IMPROVEMENT IN RAILWAY-TRUCKS.

Specification forming part of Letters Patent No. 153,918, dated August 11, 1874; application filed July 1, 1874.

*To all whom it may concern:*

Be it known that I, WILLIAM H. WRIGHT, of the town of Durham, county of Green, State of New York, have invented certain new and useful Improvements in Trucks for Railroads; and I do hereby declare that the following is a description thereof, reference being had to the accompanying drawings, forming a part of this specification, in which—

Figure 1 represents a perspective view of a section of a truck, embodying the improvements in this invention. Fig. 2 is a side view of the same. Fig. 3 is a sectional elevation taken at line No. 1 in Fig. 5. Fig. 4 is a sectional elevation taken at line No. 2 in Fig. 5. Fig. 5 is a lateral sectional elevation taken at line No. 1 in Fig. 6. Fig. 6 is a horizontal view. Fig. 7 is a face view of the stay-plates used in this invention. Fig. 8 is a face view of the same, illustrating the stay-plates made sectional. Figs. 9, 10, and 11 are side views of the same modified in their connecting parts for attachment in pairs.

My invention relates to that class of railroad-trucks employing sectional axles; and consists in the several devices hereinafter described, constructed and combined in such a manner as to preserve the sectional axles in the same relative position with each other throughout their entire lengths, and to cause their axial lines to coincide in all the condition of strain that may be brought to bear on them, whether in turning a curve or being unevenly loaded.

The object of the improvements in this invention is to render each wheel in the truck capable of being revolved independent of the others, or with different velocities, and to preserve the several bearings of the journals of the said axles in the same relative lines when unevenly loaded, and to stiffen each wheel in a perpendicular position against lateral strain that may be brought against the flanges of the wheels when running on a curve, and be thereby made to preserve the gage of the wheels to correspond with the gage of the track.

To enable others skilled in the art to make and use my invention, I will proceed to describe it in reference to the drawings and letters of reference marked thereon, the same letters indicating similar parts.

In the drawings, A A represents a pair of wheels of a truck. 2 2 are the axles of the same, each of which is secured in the hub of its wheel in a fixed manner. B B, $B^1$, and $B^2$ are the usual timbers of the frame of the truck. C C are the usual outer jaws, holding the housings $c\,c$ and the bearing boxes or saddles of the journals of the axles. $b$ is the usual strap or stay, connecting with the side timbers B and the jaws C, all of which are well known. In my invention I employ with each wheel A of the number used in a truck—whether four, six, or more are used—an axle, 2, made with its inner portions of length sufficient to reach to about a central point between the wheels A A of a pair, as shown in Fig. 5. I also employ two inner jaws, C' C', with their housings $c^1 c^1$ and the timbers $B^3\ B^3$, or their equivalent frame-pieces, to which the said inner jaws are connected, which timbers $B^3\ B^3$ are connected with the other usual frame-pieces of the truck. The inner ends of the axles 2 2 are each made with a button, $x$, as shown in Fig. 5, at the ends of the inner journals $z\,z$, which buttons are intended to lock the bearings in the central box $c^3$, as shown in said Fig. 5. The outer ends of the axle are each provided with a journal made with an end button in the usual manner, and works in the usual housings $c\,c$, carrying the usual bearings $c^4$, and working in the outer jaws C. A proper journal is made with the inner portions of the axle nigh to the hub of the wheel, and runs in bearings similar to the outer bearing $c^4$, held in the housing $c^1\ c^1$, carried by the inner jaws C' C', as shown in Fig. 5. D is a stiff bar, which I denominate the bridge, which has its ends resting on the inner housings $c\,c$, as shown, to which housings said bridge is firmly secured. The central box $c^3$ is also secured to said bridge in a firm and secure manner. Elastic springs $d\,d$ are also placed on the housings $c\,c$, and the base portion of the bridge over the housings $c^1\ c^1$, as shown, to render the truck elastic and receive the weight. The said springs may be otherwise arranged, as is the custom in some trucks. By this arrangement of the axles, with their inner ends meeting central between the wheels, and with the bridge resting on the housings and supporting the central bearings, working in the inner end journals, having buttons $x\ x$, the two sections 2 2 of the axles of a pair of wheels are preserved in parallel lines and rendered capable of sustaining an unequal loading without any liability of the axial lines of the said sectional axles being deflected from a true horizontal line, or lines coinciding throughout with each other, so that in such cases the gage of the wheels will be preserved. The jaws $C\ C'$ of each wheel are cast solid with or firmly secured to the stay-plates $G\ G$, which may be made in one piece, as shown in Figs. 5, 6, and 7, or made sectional or in two parts, as in Fig. 8, secured together at points outside the periphery of the wheel, and may be made solid in their sides, as in Figs. 9 and 10, or to consist in several radial arms, as in Fig. 11, with their ends extending in such a manner as to pass the periphery of the wheel, as shown in said Fig. 11. The said jaws may be secured by bolts to the said stay-plates, or may be cast solid with the same. As before stated, the jaws $C\ C'$ are secured to the timbers $B\ B^3$, or their equivalent pieces. Being thus secured together, the timbers $B\ B^3$ will be made to have a strong connection at the wheels by means of the plate-stays $G\ G$, connected with the jaws $C\ C'$. This connection of the said timbers at the wheels by means of the said jaws and their plate-stays operates with the frame-pieces $B^1$ and $B^2$, also connecting the pieces $B\ B^3$ to preserve the jaws $C\ C'$ parallel with each other, and to maintain the housings $c\ c^1$ and their bearings from being spread out from each other, as in those trucks employing sectional axles with a jaw on each side of the wheel, but having no connecting plate-stays. Each pair of wheels and their axles are connected together in a manner independent of the usual frame-work by means of the bars $E\ E$ and $E'$, as shown in Fig. 6, by the bars $E\ E$ running across from one pair of stay-plates to the other, and secured to the same, or by bars passing through the eyes $e^1\ e^1$, made in the said stay-plates and secured by nuts, tightening the said stay-plates against a shoulder made with said bars, when used with the eyes $e^1\ e^1$, and the bar $E'$ connecting with the frame-pieces $B^2\ B^2$, as in Figs. 1, 5, and 6, or by an equivalent bar connecting with the top portions of the stay-plates by the eye $e^2$, shown in Figs. 9 and 10. Two such bars $E'$ may be used above the axles, if desired, as may be seen in Fig. 11, which I would prefer when the stay-plates are made with a skeleton form or with arms, as in said Fig. 11.

It is readily seen that by the employment of the lower bars $E\ E$ and the upper bar $E'$, or two of the same with each wheel of a pair and their stay-plates, the said wheels are, by their housings and their jaws, secured to the stay-plates, rendered stable in their perpendicular position, and firm to resist all crowding inward of their lower sides when pressed against by any lateral strain that may be brought against the flange of the wheels, as the said bars $E\ E$ below the truck-frame proper, and the bar $E'$ above the same, operates as a truss to prevent any deflection of the wheels from true parallels with each other, as is required for safety, and preserving the gage of the wheels. It is also seen that bridge D, secured to the central bearing $c^3$, and the housings $c^1\ c^1$ coacts with the truss formed by the bars $E\ E$ and $E'$ and the stay-plates and their jaws to prevent the least deflection of the axles 2 2 from a true parallel line with each other, even when unevenly loaded, or when the flange of either wheel is pressed against by the rail when turning a curve, and that by the employment of the end buttons $x\ x$, on the inner ends of the axles 2 2, and the central bearings engaging with the said end buttons, together with the bridge connected to the housings, all liability of the axles being spread apart laterally is wholly prevented.

These improvements are such as render the truck, provided with wheels having sectional axles, to be as firm to maintain the wheels in their true and original gage against all lateral strain or uneven loadings the truck may receive.

The advantages arising from these improvements are these: Each wheel is permitted to revolve independent of the other, and with greater or less velocity according to the inequalites of the length of surfaces of the rails run over in the track, and the gage of the wheels is preserved as fully as if made with solid and continuous axles, as now universally employed, while the tendency for running off the rails is greatly lessened, as also the breaking of the flanges of the wheels or rails, as is common in cold weather with trucks having solid and rigid axles.

Having described my invention, what I claim, and desire to secure by Letters Patent, is—

1. In a truck having wheels with sectional axles, the bridge D, supported at its outer ends by housings working in jaws and secured thereto, and the central bearings secured to the said bridge, in combination with the inner end portions of two sectional axles, $a\ a$, projecting past the inner jaws and their housings toward the center of the truck, substantially as set forth.

2. In a truck having wheels carried by sectional axles, the buttons $x\ x$, made on the inner and long ends of the axles, in combination with the central bearings $c^3$ and bridge D, supported by and secured to the housings at its ends, substantially as set forth.

3. In a truck with wheels and sectional axles, the housings $c\ c^1$, rendered elastic and carried by jaws $C\ C'$, one on each side of each wheel, and connected to the frame-pieces $B\ B^3$, in combination with the bridge D, having its ends attached to housings, and the central bearing secured to the said bridge, substantially in the manner set forth.

4. The combination of the stay-plate G G with an outer and inner jaw, each carrying a housing for supporting a wheel, having an axle disconnected with its opposite wheel, and the frame-pieces B B³ of the truck, substantially as set forth.

5. In a truck having wheels carried by sectional axles, the bars E E and E', in combination with the stay-plates G and the jaws C C', substantially in the manner set forth.

6. In a truck employing wheels rendered capable of revolving independently of each other, and at different velocities, the bridge D, connected with and supported at its ends by elastic housings carried by jaws placed near the hub of the wheel, in combination with the inner long ends of a pair of sectional axles, the central bearing placed between the inner jaws, and the bars E E and E', connecting with the stay-plates G, substantially as set forth.

WILLIAM H. WRIGHT.

Witnesses:
CHAS. J. SELKIRK,
ALEX. SELKIRK.